(12) United States Patent
Chen et al.

(10) Patent No.: US 9,223,909 B2
(45) Date of Patent: *Dec. 29, 2015

(54) CASCADED EDDY SIMULATION (71) Applicant: Exa Corporation, Burlington, MA (US)

(72) Inventors: Hudong Chen, Newton, MA (US); Steven Orszag, Princeton, NJ (US); Ilya Staroselsky, Lincoln, MA (US); Victor Yakhot, Newton, MA (US); Raoyang Zhang, Burlington, MA (US)

(73) Assignee: Exa Corporation, Burlington, MA (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/943,853

(22) Filed: Jul. 17, 2013

(65) Prior Publication Data
US 2013/0317794 A1 Nov. 28, 2013

Related U.S. Application Data (63) Continuation of application No. 11/773,531, filed on Jul. 5, 2007, now Pat. No. 9,031,819.

(60) Provisional application No. 60/830,805, filed on Jul. 14, 2006.

(51) Int. Cl.
*G06G 7/50* (2006.01)
*G06G 7/48* (2006.01)
*G06F 17/50* (2006.01)
*G06T 13/20* (2011.01)

(52) U.S. Cl.
CPC ........ *G06F 17/5009* (2013.01); *G06F 17/5018* (2013.01); *G06T 13/20* (2013.01); *G06F 17/5095* (2013.01); *G06F 2217/16* (2013.01); *G06T 2210/24* (2013.01)

(58) Field of Classification Search
CPC ............ G06F 17/5009; G06F 17/5018; G06F 17/5095; G06F 2217/16; G06T 2210/24; G06T 13/20
USPC ....................................... 703/9, 10
See application file for complete search history.

(56) References Cited

U.S. PATENT DOCUMENTS

| 5,910,902 | A  | 6/1999  | Molvig        |
|-----------|-----|---------|---------------|
| 6,823,297 | B2 | 11/2004 | Jenny         |
| 7,120,544 | B2 | 10/2006 | Duncan        |
| 7,379,852 | B2 | 5/2008  | Freitas et al.|
| 7,496,488 | B2 | 2/2009  | Jenny et al.  |

(Continued)

OTHER PUBLICATIONS

Boersma, et al., "Local Grid Refinement in Large-Eddy Simulations," Journal of Engineering Mathematics, vol. 32, 1997, pp. 161-175.

(Continued)

*Primary Examiner* — Kamini S Shah
*Assistant Examiner* — Andre Pierre Louis
(74) *Attorney, Agent, or Firm* — Fish & Richardson P.C.

(57) ABSTRACT

A fluid flow is simulated by causing a computer to perform operations on data stored in the memory to compute at least one eddy of a fluid flow at a first scale and perform operations to compute at least one eddy of the fluid flow at both the first scale and a second scale. The second scale is a finer scale than the first scale, and the computation of the at least one eddy of the fluid flow at the second scale is constrained by results of the computation of the at least one eddy of the fluid flow at the first scale.

22 Claims, 10 Drawing Sheets

(56) References Cited

U.S. PATENT DOCUMENTS

| | | | |
|---|---|---|---|
| 7,555,413 B2* | 6/2009 | Inagaki | 703/2 |
| 7,668,705 B2 | 2/2010 | Kalitzin et al. | |
| 2006/0087509 A1 | 4/2006 | Ebert et al. | |
| 2008/0015830 A1 | 1/2008 | Chen et al. | |
| 2008/0091379 A1* | 4/2008 | Lynch et al. | 702/140 |

OTHER PUBLICATIONS

Borue et al., "Numerical Study of Three-Dimensional Kolmogorov Flow at High Reynolds Numbers," Cambridge Journals, Journal of Fluid Mechanics Digital Archive, vol. 136, 1996, pp. 293-232.

Chen et al., "Extended Boltzmann Kinetic Equation for Turbulent Flows," Science, Aug. 1, 2003, vol. 301, pp. 633-636.

Farge, et al., "Wavelets and Turbulence," Proceedings of the IEEE, vol. 84, No. 4, Apr. 1996, pp. 639-669.

Holm et al., "The LANS-α Model for Computing Turbulence: Origins, Results, and Open Problems," Los Alamos Science, No. 29, 2005, pp. 152-171.

International Search Report & Written Opinion, PCT/US2007/73366, Jul. 15, 2008, 16 pages.

Japanese Office Action, with English Translation, JP Application No. 2009-520904, dated Jul. 30, 2012, 4 pages.

Orzag, "Equilibrium Properties of Cumulant-Discard Closures;" "Stochastic Relaxation," "Mechanisms of Irreversible Relaxation," in Lectures on the Statistical Theory of Turbulence, from Fluid Dynamics, 1977, pp. 334-344.

Orzag, "Inviscid Equipartition Ensembles," in Lectures on the Statistical Theory of Turbulence, from Fluid Dynamics, 1977, pp. 324-328.

Orzag, "Small-Scale Structure of Turbulence;" "Two-Dimensional Homogeneous Turbulence," in Lectures on the Statistical Theory of Turbulence, from Fluid Dynamics, 1973, pp. 276-287.

"Phenomonology of Turbulence in the Sense of Kolmogorov 1941," in Frisch, Turbulence: The Legacy of A. N. Kolmogorov, 1996, pp. 96-101.

Piomelli, et al., "Large-eddy simulation: achievements and challenges," Progress in Aerospace Sciences, vol. 35, 1999, pp. 335-362.

Pironneau, Olivier, Modeles numeriques pour les ecoulements turbulents dans des geometries complexes, (English Abstract), C.R. Acad. Sci. Paris, t. 327, Serie II b, 1999, pp. 325-331.

Rodi, Wolfgang, "DNS and LES of some engineering flows," Fluid Dynamics Research, 38 (2006) 145-173.

Succi, et al., "Towards a Renormalized Lattice Boltzmann Equation for Fluid Turbulence," Journal of Statistical Physics, vol. 107, Nos. 112, Apr. 2002, pp. 261-278.

Supplementary European Search Report, EP07799536, Mar. 9, 2011, 2 pages.

Uchiyama, Naoki, "Numeric Analysis of Compressible Flow by Multistage Level Adaptive Mesh Refinement Method," (English Abstract) Proceedings of the 23rd Fluid Dynamics Conference, Nov. 1991, pp. 25-28.

Yakhot et al., "Development of Turbulence Models for Shear Flows by a Double Expansion Technique," American Institute of Physics, Phys. Fluids A, vol. 4, No. 7, Jul. 1992, 11 pages.

Zhang, et al., "Effective Volumetric Lattice Boltzmann Scheme," Physical Review E, vol. 63, Apr. 24, 2001, pp. 056705-1 to 056705-6.

Zhong, et al., "Extracting 3D Vortices in Turbulent Fluid Flow," IEEE Transactions on Pattern Analysis and Machine Intelligence, vol. 20, No. 2, Feb. 1998, pp. 193-199.

* cited by examiner

CASCADED EDDY SIMULATION

CROSS REFERENCE TO RELATED APPLICATIONS

This application is a continuation application and claims priority under 35 U.S.C. §120 to U.S. patent application Ser. No. 11/773,531 filed on Jul. 5, 2007, titled CASCADED EDDY SIMULATION, now U.S. Pat. No. 9,031,819 which claims the benefit of U.S. Provisional Application No. 60/830,805, filed Jul. 14, 2006, and titled CASCADED EDDY SIMULATION, the entire contents of which are hereby incorporated by reference.

TECHNICAL FIELD

This description relates to computer systems for simulating physical processes, e.g., a fluid flow.

BACKGROUND

A fluid may be generally defined as any substance that can flow. Fluids encompass gases, liquids and combinations of gases and liquids. The field of fluid dynamics attempts to explain and characterize the behavior of fluids. The behavior of fluids may be characterized through differential equations.

SUMMARY

In one general aspect, a computer simulates a fluid flow by performing operations on data stored in the memory to compute at least one eddy of a fluid flow at a first scale and performing operations to compute at least one eddy of the fluid flow at both the first and a second scale. The second scale is a finer scale than the first scale, and the computation of the at least one eddy of the fluid flow at the second scale is constrained by results of the computation of the at least one eddy of the fluid flow at the first scale.

Implementations may include one or more of the following features. For example, the computation of the at least one eddy of the fluid flow at the combined first and second scales may be constrained such that an energy spectrum of the fluid flow is substantially the same statistically as the results of the computation of the at least one eddy of the fluid flow at the first scale.

Operations may be performed to compute at least one eddy of the fluid flow at a third scale where third scale is a finer scale than the second scale, and the computation of the at least one eddy of the fluid flow at the third scale is constrained by results of the computation of the at least one eddy of the fluid flow at the second scale.

A region of the fluid flow at the third scale may be identified, where the region represents a region of activity that is significant to the computing of the fluid flow at the third scale, and operations may be performed to compute at least one eddy of the identified region of the fluid flow at a third scale. Operations may be performed to conditionally sample the fluid flow at the third scale to identify the region of significant activity. Conditionally sampling the fluid flow at the third scale may include conditionally sampling at least one of local shear, local vorticity and a combination of shear and vorticity or some other flow quantity.

Operations to compute at least one eddy of the fluid flow at a second scale may include determining a modification of the flow equation used to compute the at least one eddy of the fluid flow at the second scale, and computing the at least one eddy of the fluid flow at the second scale using the flow equation as modified.

Operations to compute at least one eddy of the fluid flow at a second scale further may include analyzing results of the computation at the second scale to determine whether the forcing is to be modified. In response to a determination that the forcing is to be modified, a determination may be made whether a second forcing is to be applied by a flow equation used to compute the at least one eddy of the fluid flow at the second scale. The computing the at least one eddy of the fluid flow at the second scale may use the flow equation modified by the determined second forcing. The modified flow equation used to compute the at least one eddy of the fluid flow at the second scale may include a modified Navier-Stokes equation, a modified kinetic equation, a modified flow equation that includes a relaxation term, or a modified flow equation that includes a dampening term.

In another general aspect, a computer system for simulating a fluid flow includes a processor, a memory and a mass storage device. The system is configured to perform operations on data stored in the memory to compute at least one eddy of a fluid flow at a first scale and perform operations to compute at least one eddy of the fluid flow at a second scale. The second scale is a finer scale than the first scale, and the computation of the at least one eddy of the fluid flow at the second scale is constrained by results of the computation of the at least one eddy of the fluid flow at the first scale.

Implementations may include one or more of the features noted above and one or more of the following features. For example, the system may be configured to perform operations only on data stored in the memory to compute at least one eddy of the fluid flow at the second scale. The system may be configured to perform operations on data stored in the memory and data stored on the mass storage device to compute at least one eddy of the fluid flow at the second scale.

Implementations of the techniques discussed above may include a method or process, a system or apparatus, or computer software on a computer-accessible medium.

Other features will be apparent from the following description, including the drawings, and the claims.

DETAILED DESCRIPTION

Turbulent flows are characterized by a large range of scales of motion. Indeed, the general theory of turbulence characterizes turbulent flows as having a range of excitations ranging from coarse eddies, representative of the scales at which the turbulence is formed either due to forcing or geometry, to fine eddies which act to dissipate the energy input at the coarser scales. Thus, one view of turbulent flows involves a "cascade" of eddy sizes as well as a "cascade" of energy from the coarse, energy-containing eddies to fine-scale "dissipating eddies."

Figure 1A:
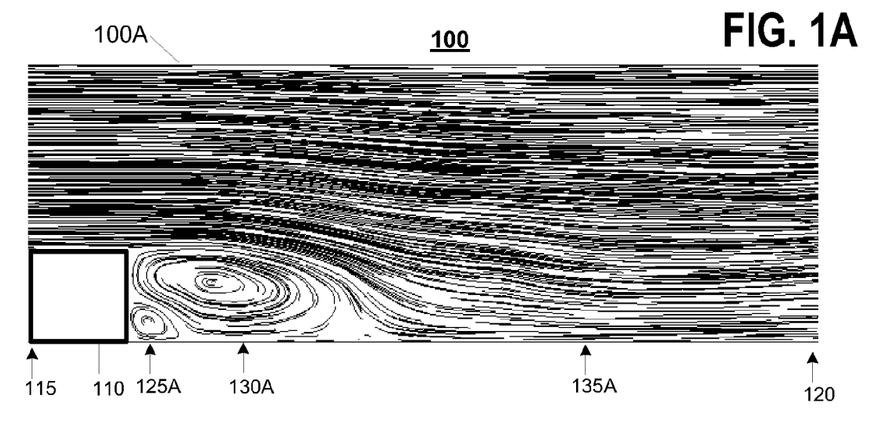
FIGS. 1A-1C are diagrams of a simulation of a turbulent flow over a tangible object.
Figure 1B:
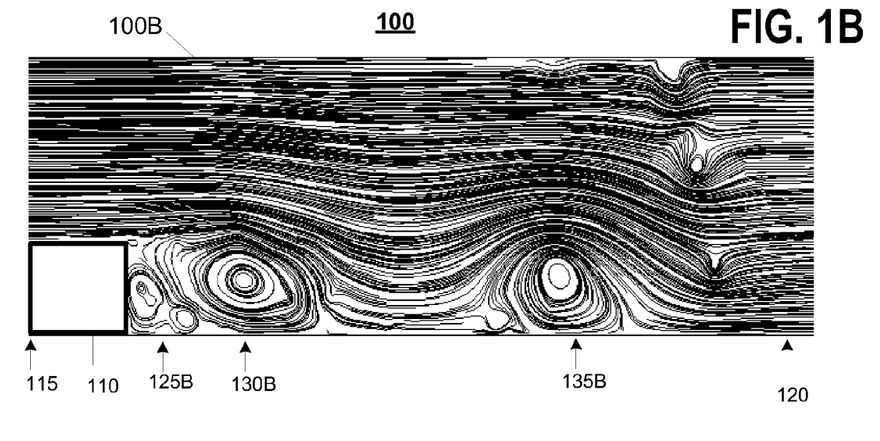
Figure 1C:
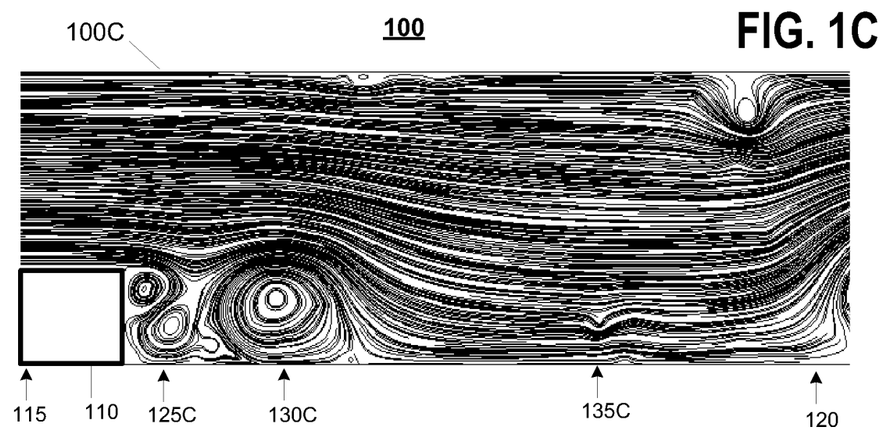

FIGS. 1A-1C illustrate a simulation of a turbulent flow 100 over a tangible object 110 (here, a step). The turbulent flow 100 is passing from the point 115 to the point 120 in FIGS. 1A-1C.

FIG. 1A illustrates the averaged flow 100A over a time period from 31 seconds to 61 seconds from the start of the simulation. As such, the averaged flow 100A illustrates an example of a coarse scale eddy of the flow, such as coarse scale eddy 210 described below with respect to FIG. 2. The averaged flow 100A includes coarse eddies 125A and 130A, as well as a portion 135A of the averaged flow that does not appear to include a coarse eddy. FIGS. 1B and 1C each depict examples of finer scale eddies that form within the flow 100 at particular points of time.

More particularly, FIG. 1B depicts a snapshot of the flow 100 at about 31 seconds from the start of the simulation and shows finer scale eddies 125B and 130B that form within the coarse scale eddies 125A and 130A at that point of time, as well as a finer scale eddy 135B that forms in the portion 135A. The finer scale eddies 125B, 130B and 135B are examples of fine scale eddies of the turbulent flow 100, such as finer scale eddies 230 described below with respect to FIG. 2. As illustrated, the finer scale eddies 125B show more detail than the corresponding coarse scale eddy 125A of FIG. 1A. Similarly, the finer scale eddy 130B shows more detail than the coarse scale eddy 130A of FIG. 1A. In contrast with the portion 135A of the flow of FIG. 1A, the finer scale eddy 135B is visible.

FIG. 1C shows a snapshot of the flow 100 at an even later time—that is, about 61 seconds from the start of the simulation—and illustrates still finer scale eddies that form at that later point in time within coarse scale eddies. The finer scale eddies 125C and 130C are examples of finer scale eddies of the turbulent flow 100, such as finer scale eddies 240 described below with respect to FIG. 2. As illustrated, the eddies 125C and 130C show more detail than the corresponding coarse scale eddies 125A and 130A of FIG. 1A. In contrast with eddy 135B of FIG. 1B, a finer scale eddy 135C has nearly dissipated.

Figure 2:
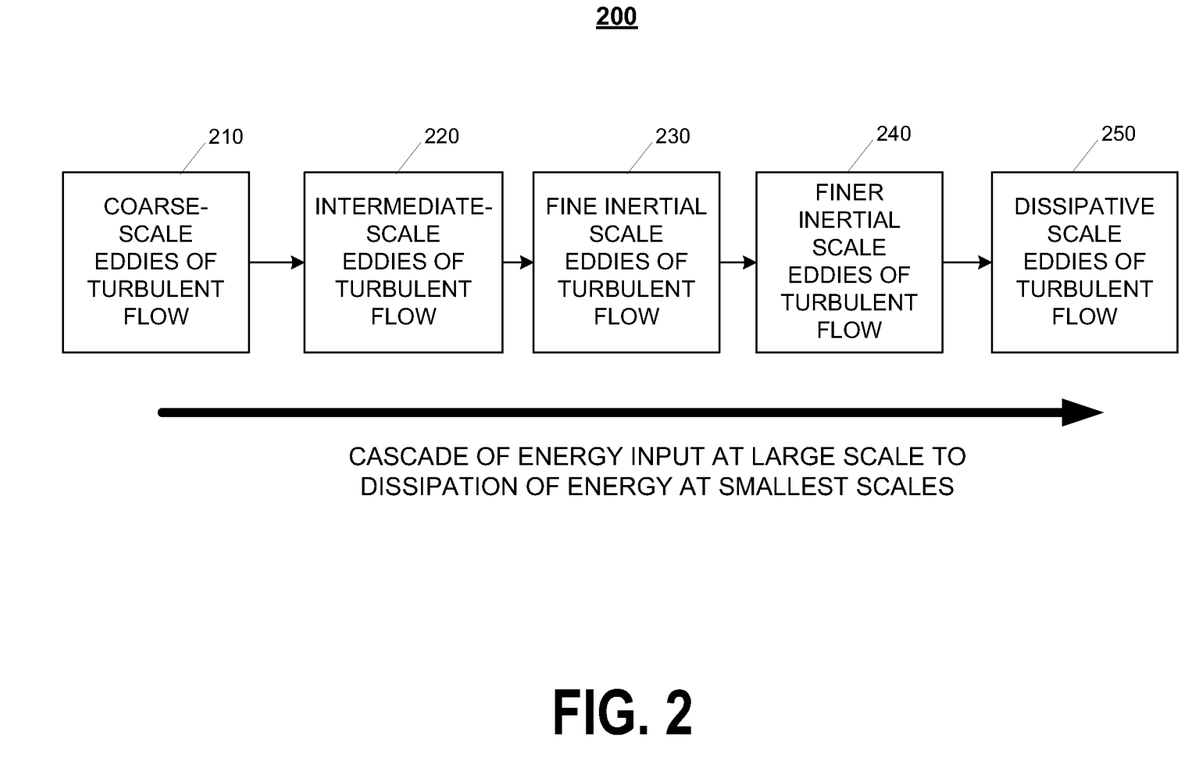
FIG. 2 is a block diagram of a cascade of eddy sizes in a turbulent flow.

FIG. 2 conceptually illustrates a cascade 200 of eddy sizes 210-250 in a turbulent flow. In general, there is a cascade of energy input at a coarse scale to dissipation of the energy at the finest scales. More particularly, and as described in more detail later with respect to FIG. 3, there is a cascade of energy from coarse scale eddies 210 to intermediate scale eddies 220 to inertial scale eddies 230, 240 and to dissipative scale eddies 250. There may be more scales of inertial eddies shown, which progressively get finer as energy flows from the intermediate eddies 220 to the dissipative eddies 250. In this example, inertial eddies 230 may be referred to as "fine inertial eddies" and inertial eddies 240 may be referred to as "finer inertial eddies."

Figure 3:
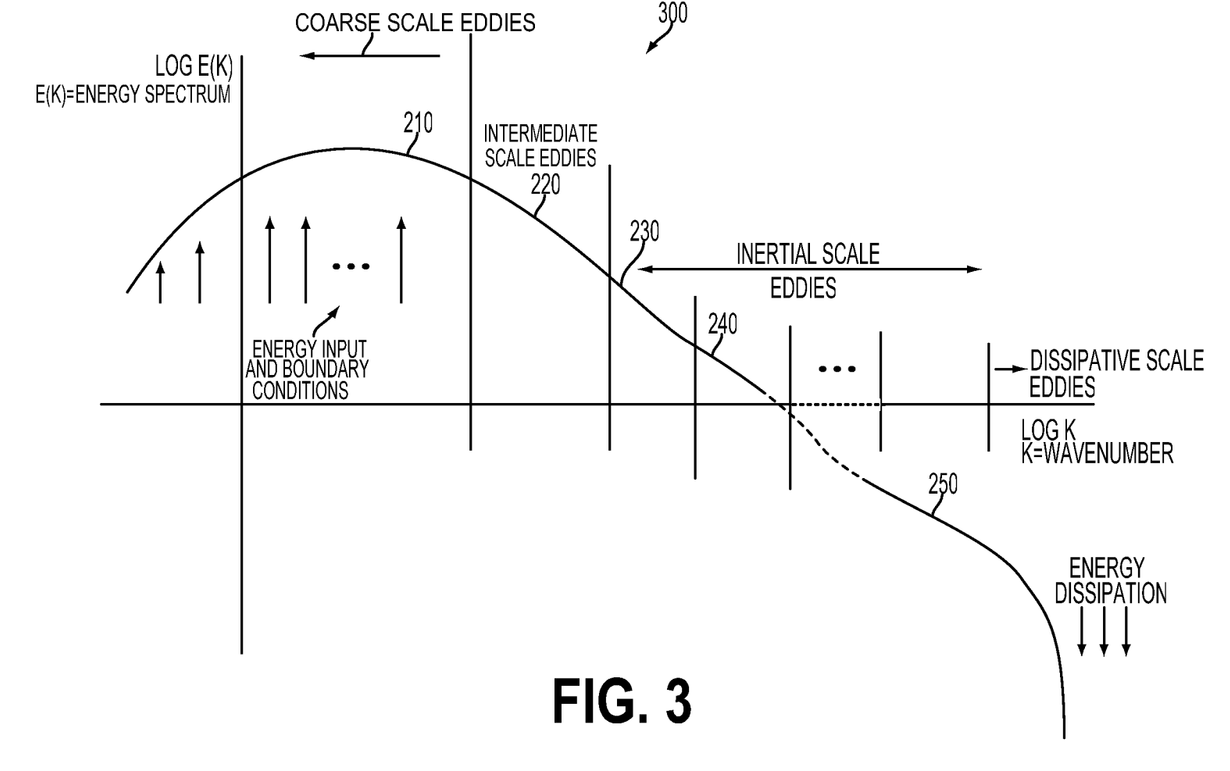
FIG. 3 is a diagram illustrating the qualitative energy spectrum of a turbulent flow as energy is dissipated from coarse eddies to dissipative scale eddies.

FIG. 3 illustrates the qualitative energy spectrum 300 of a turbulent flow as energy is dissipated from coarse eddies 210 to dissipative scale eddies 250, where the dissipation of energy input at the coarsest scale is completed. In particular, energy is input into the turbulent flow at the coarsest-scale eddies 210, and energy is dissipated from the turbulent flow at the very finest scales—here, called dissipative scale eddies 250.

The qualitative energy spectrum shown in FIG. 3 is consistent with the underlying dynamics of flows, governed by the Navier-Stokes (N-S) equation, or its extensions to more complex flow situations such as compressible or multiphase flows:

$$\frac{\partial v}{\partial t} + v \cdot \nabla v = -(1/\rho)\nabla p + \nu \nabla^2 v. \quad (1)$$

Here $v(x,t)$ is the velocity field which depends on the three-dimensional position x and the time t, $\rho$ is the density, p is the pressure field, and $\nu$ is the kinematic viscosity of the flow. The solutions to the N-S equation are turbulent when $\nu \to 0$; indeed, it is conventional to non-dimensionalize the N-S equation in terms of the Reynolds number R, which is defined as the non-dimensional quantity $$R = UL/\nu,$$

where U is a typical coarse scale velocity magnitude and L is the length scale over which this velocity U is coherent. When R is small, flows are typically non-turbulent. Stated differently, flows are typically laminar when R is small, and, as R increases, flows typically first undergo transition from laminar to turbulence, and then, at coarse R, flows become "fully turbulent." When R is large, there is a significant challenge in solving the N-S equation by numerical methods. The challenge is that, as R increases, the excited eddies of a turbulent flow have a range of sizes and times scales that increase at least at the rate of $R^{3/4}$ so the numerical resolution must increase rapidly with R. With three space dimensions plus time, this result implies that the computational work scales as $(R^{3/4})^4 = R^3$. The simulation of the turbulent flow past real-world coarse-scale flows (like flow past a large ship) has been estimated to require on the order of Avogadro's number ($6 \times 10^{23}$) or more arithmetic computations, which is well beyond the capability of today's supercomputers. Thus, it is necessary to make either theoretical or numerical simplifications in the analysis of such real-world flows.

Techniques are provided for computationally simulating a turbulent flow by (1) computing some coarse-scale eddies of the turbulent flow and (2) computing the remaining scales to a resolution-limited grid scale to obtain cascaded eddies that are typically produced by the computed coarse-scale eddies. The techniques may be implemented in a physical process simulation system that uses cascaded eddy simulation (CES) to accurately and effectively computationally simulating turbulent flows in complex geometries at scales limited only by the available central memory of a computer system. Additional techniques are described that help to mitigate memory limitations.

In general, at least some of the coarse scale eddies of a turbulent flow are computed to provide statistical limits, within which finer scale eddies typically produced by the coarse scale eddies are computed. While specifics of the coarse scale eddies may be modified in the computation of finer scale eddies, the statistical properties of the coarse scale eddies remain largely intact in the presence of finer scale eddies. The finer scale eddies may be referred to as "cascaded eddies." Computations of eddies at finer scales may be iteratively performed to obtain cascaded eddies to finer scales where molecular dissipation is effective. All of the cascaded eddies are limited by the statistical properties of the coarse scale eddies.

Figure 4:
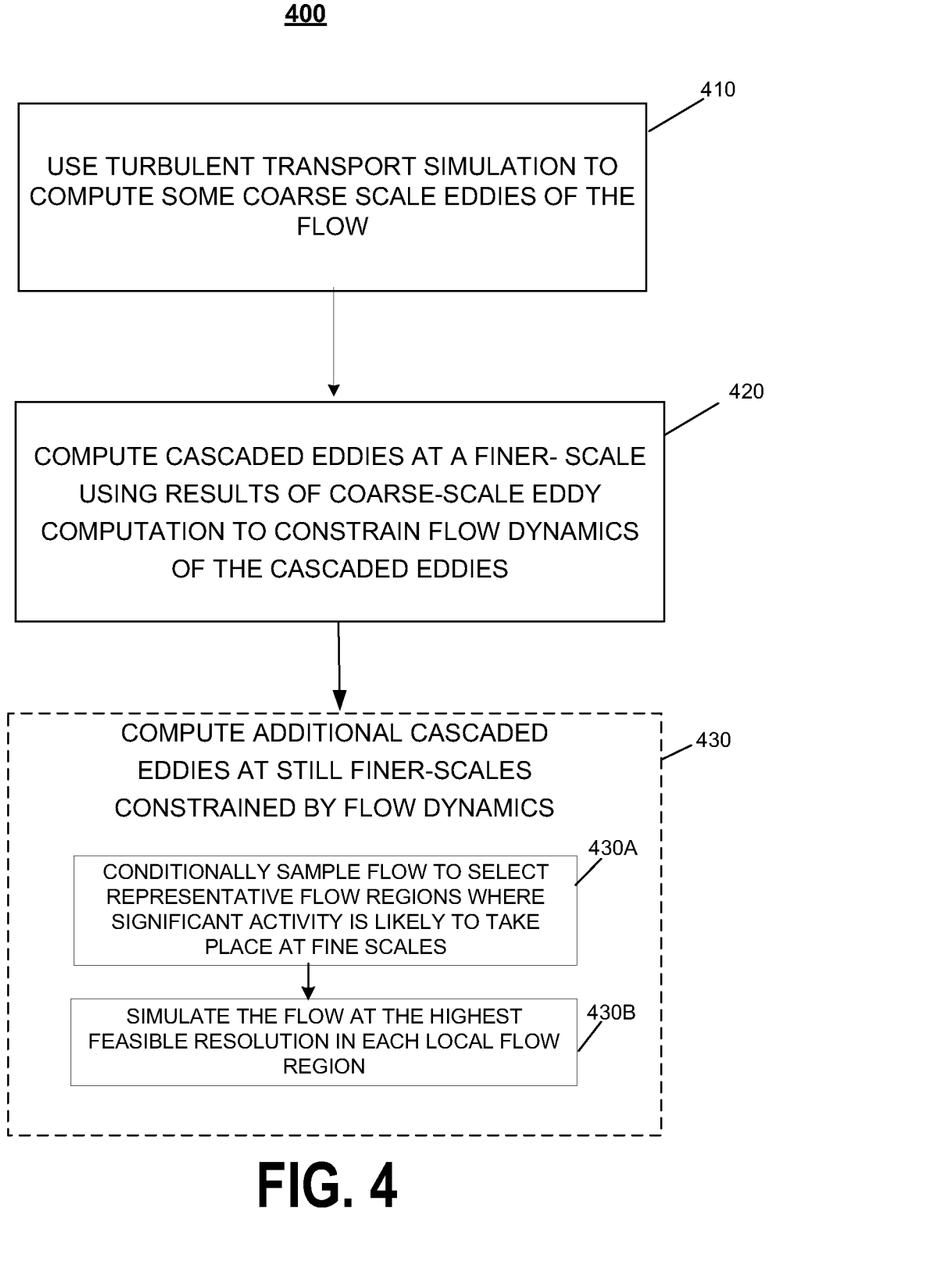
FIG. 4 is a flow chart of an example process for a cascaded eddy simulation.

Referring to FIG. 4, a process 400 for a cascaded eddy simulation begins with computation of coarse-scale eddies of interest in the specific turbulent flow (step 410). To do so, various methods, including Very Large Eddy Simulation, Large Eddy Simulation, Reynolds Averaged Navier-Stokes Simulation or another method are used to compute at least some of the coarser eddies of a turbulent flow, especially taking into account the flow geometry, flow forcing and other details of the flow environment. Various numerical methods may be used, including, but not limited to, finite difference, finite element, spectral and spectral element solutions of suitable averaged Navier-Stokes equations or lattice Boltzmann or BGK kinetic methods with or without appropriate turbulence models. As an example of this step, lattice BGK tools (such as PowerFlow code by Exa Corporation) may be used to compute the very-coarse eddies of complex flows. These lattice BGK tools have the added advantage that results are nearly independent of Reynolds number when the Reynolds number is high and results typically lead to coarse eddies that exhibit some degree of time dependence, if appropriate. More generally, step 410 may be referred to as the first step or step 1 of the CES process.

Next, there is a computation down to a resolution-limited grid scale that is limited by the flow dynamics obtained in step 410 (step 420). In other words, eddies of the turbulent flow are computed at a finer-scale and the flow dynamics of the fine-scale eddies are constrained by results of the coarse-scale eddy computation. In step 420, the flow dynamics obtained in step 410, which typically are limited in resolution to fairly coarse eddies, are enhanced by a second computation. This second computation is, in a general sense, controlled by the first simulation results so that the coarse eddies computed by step 410 are not modified in a major way in the statistical sense. While details of the coarse eddies computed in step 410 may be modified in step 420, the statistical properties of the coarse eddies remain largely intact. For example, boundary condition assumptions consistent with the coarse-scale eddies may be applied to the computation of the finer-scale eddies. The second computation in step 420 is to obtain the "cascaded eddies" typically produced by the coarse eddies of step 410 and that typically cascade to finer scales where molecular dissipation is effective. More generally, step 420 may be referred to as the second step or step 2 of the CES process.

The second computation (in step 420) may be done in several ways. In one example, the cascaded eddies are computed by solving the flow equations (whether the flow equations be the Navier-Stokes equations or a kinetic equation like the lattice BGK equation) so that the total flow field (that is, the coarse eddies and the cascaded eddies), when filtered by an appropriate coarse-scale filter, yields a flow field that is statistically similar to the flow field obtained in step 410. In another example, a relaxation scheme may be used to relax (perhaps, with scale-dependent relaxation times/distances) the coarse-scale part of the full flow towards the coarser eddy flow obtained in step 410. In still other implementations, the coarse-scale eddies can be locked between the field of step 410 and that of step 420.

In a more particular example of using a relaxation scheme with Navier-Stokes equations, the basic form of the Navier-Stokes equation $$\frac{\partial v}{\partial t} + v \cdot \nabla v = -\frac{1}{\rho}\nabla p + \nu\nabla^2 v$$

may be modified to include additional terms representing extra forces, filters or relaxation terms. One example of such a modified Navier-Stokes equation that may be used to compute eddies in step 420 is $$\frac{\partial v}{\partial t} + v \cdot \nabla v = -\frac{1}{\rho}\nabla p + \nu\nabla^2 v - \frac{v-u}{\sigma}$$

where u is the coarse-scale field computed in step 410 and $\sigma$ is a relaxation time, which may be scale dependent.

In another example, the basic form of lattice BGK equation $$\frac{\partial f}{\partial t} + v \cdot \nabla f = -\frac{f - f_{eq}}{\tau}$$

can be modified to be used in step 420 computation of cascaded eddies $$\frac{\partial f}{\partial t} + v \cdot \nabla f = -\frac{f - f_{eq}}{\tau} - \frac{f - f_{LS}}{\sigma}$$

where $f_{LS}$ is a (Large Scale) single-particle distribution function that generates the coarse-scale field u and $\sigma$ is a relaxation term, which may be scale dependent. In typical implementations, the flow obtained in step 420 depends on Reynolds number and on grid resolution. In contrast to DNS (direct numerical simulation of turbulence), for example, the method of step 420 can be designed so that there is mitigated dependence on grid resolution and Reynolds number (which are the most significant restrictions of DNS or LES (coarse-eddy simulation)). These latter restrictions on DNS/LES include unphysical behavior if the grid resolution is too coarse for the given Reynolds number—often seen as unphysically large energies at or near the grid scale. The key defect of DNS and LES that is avoided by the CES techniques is the requirement that the turbulence dissipation scale be much coarser than the grid resolution, sometimes cited to be a factor of 16 or more. With CES, the factor of 16 can be reduced to the order of 1 or 2.

In addition, the spatial and temporal resolution in step 420 can be different than in step 410. Furthermore, step 420 can have a different Mach number to account for accurate acoustic propagation and resonance effects. Step 410 need not account for the latter effects and may have the Mach number be small or even zero (representing an incompressible flow). Also, the computational domains for step 420 can be different from step 410. The domain for step 420 may be a subdomain of that of step 410, which may help increase efficiency of the computations and reduce computer memory requirements. The domain for step 420 may be a larger domain than the domain of step 410, which includes more distant places due to its very low numerical dissipation. On the contrary, acoustic information in step 410 may be unable to propagate over substantial spatial distance due to turbulent eddy viscosity.

Figure 5:
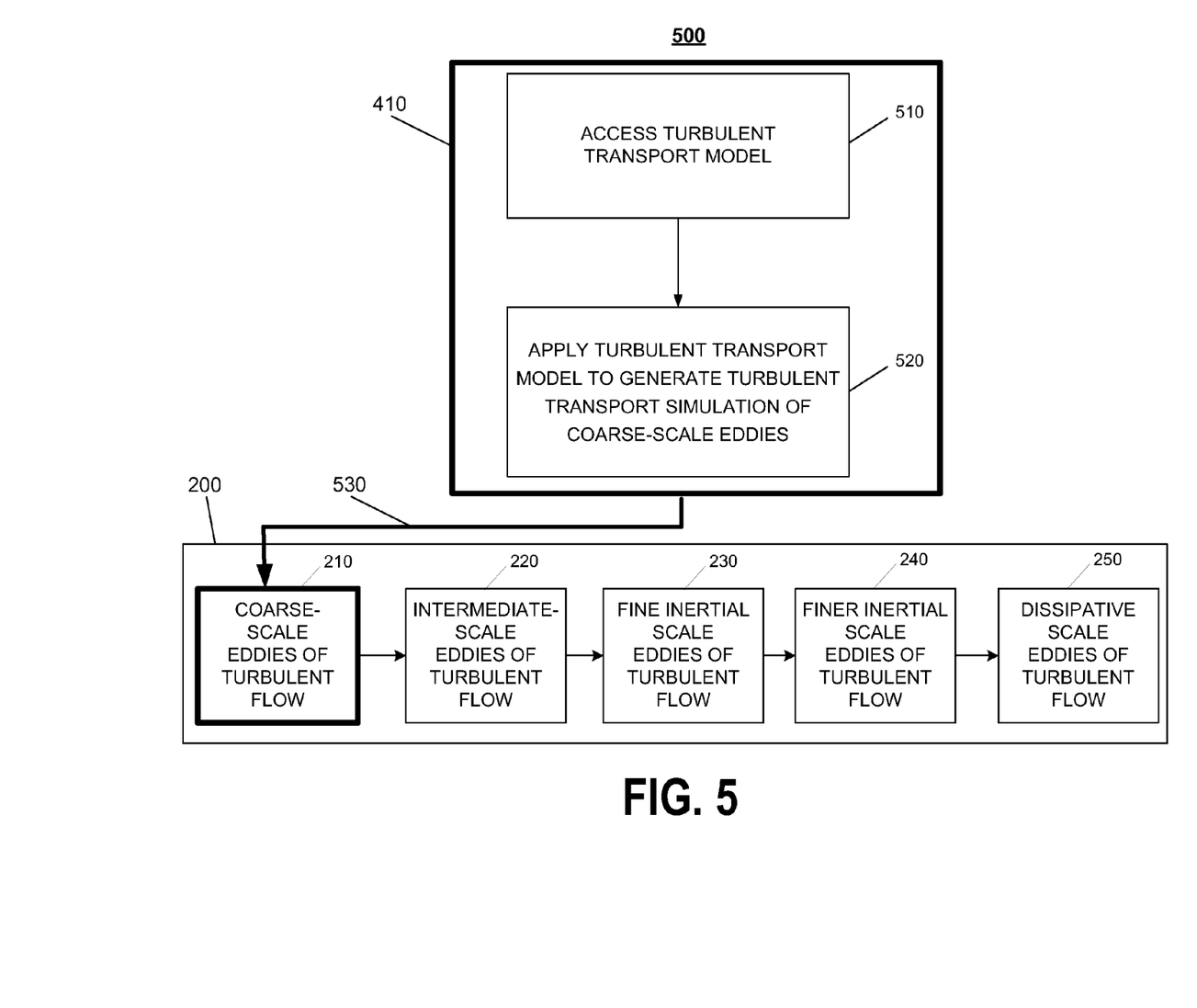
FIG. 5 is a flow chart of an example process for computing some coarse-scale eddies of a turbulent flow.

FIG. 5 shows an example process 500 for computing some coarse-scale eddies of a turbulent flow. The example process 500 may be an implementation of step 410 described previously with respect to FIG. 4. The process includes accessing, for example from computer memory, a turbulent transport model (step 510) and applying the turbulent transport model to generate a turbulent transport simulation of coarse-scale eddies (step 520). One implementation of a turbulent transport model may be a turbulence model developed by supplementing a renormalization group approach with scale expansions for the Reynolds stress and production of dissipation terms. As shown by arrow 530, the results of the process 500 represent the coarse-scale eddies 210 in the real world turbulent flow 200 described previously with respect to FIG. 2.

Figure 6:
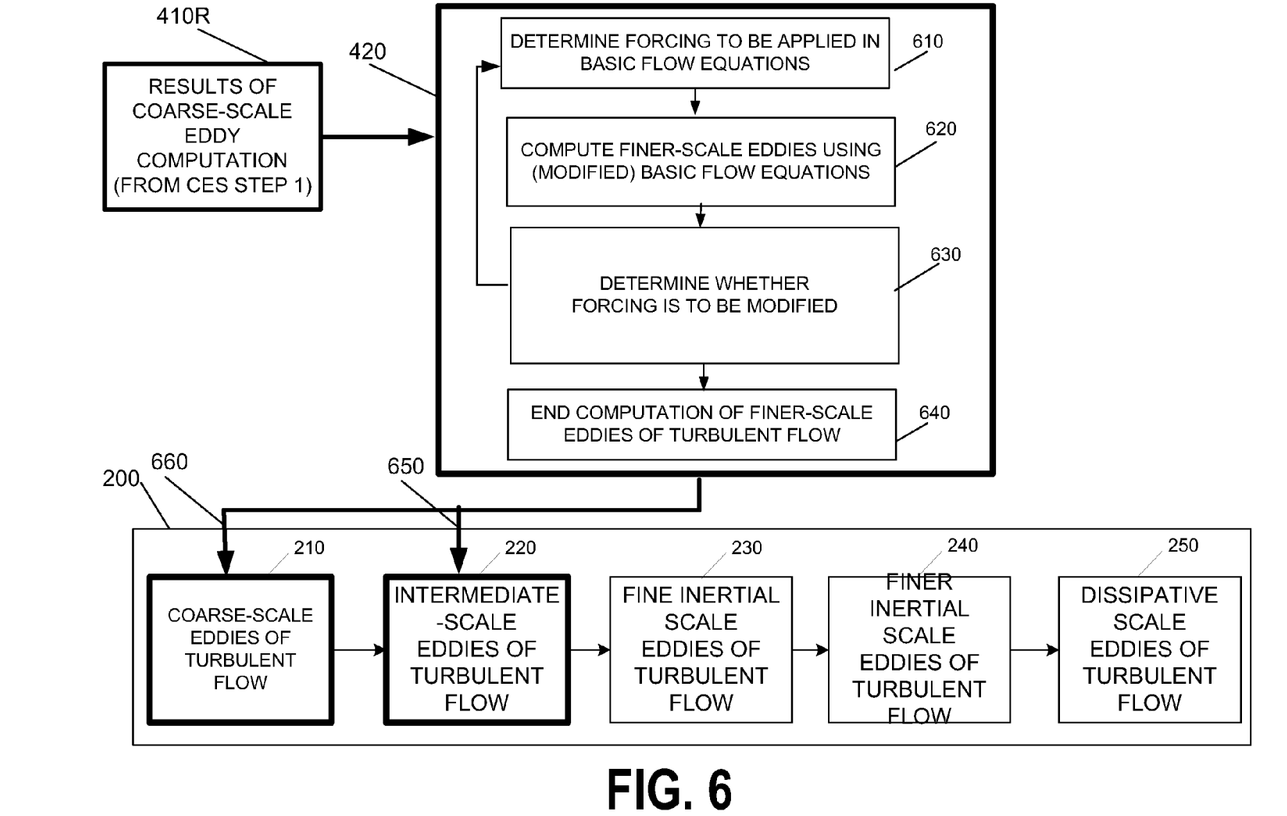
FIG. 6 is a flow chart of an example process 600 for computing cascaded eddies resulting from the coarse-scale eddies of a turbulent flow.

FIG. 6 shows an example process 600 for computing cascaded eddies resulting from the coarse-scale eddies of a turbulent flow. The example process 600 may be an implementation of step 420 described previously with respect to FIG. 4. The process 600 receives results 410R of coarse-scale eddy computation of the turbulent flow, such as the result of step 410 described previously. The process 600 includes determining initial forcing to be applied in the basic flow equations, such as the Navier-Stokes equation or the Lattice Boltzmann (LBE) equation (step 610). In one example, as described previously, a relaxation term or another type of damping term may be added to the basic flow equation to drive the result of the computation toward the results obtained for the coarse-scale eddies. In another example, a driving term may be added to a basic flow equation to force the result computation toward the results obtained for the coarse-scale eddies.

After computing finer-scale eddies using the (modified) basic flow equations for a period of time (step 620), the partial computation results are checked to determine whether the forcing being applied in the modified basic equations needs to be changed (step 630). Stated differently, a modified force feedback loop may be applied to the computation of finer-scale eddies to ensure that the results of the computation of coarse-scale eddies are adequately reflected in the results of computing the finer-scale eddies. If a determination is made that the forcing applied by the basic flow equations needs to be changed to reflect the results of computing the coarse-scale eddies, the forcing to be applied is determined again (step 610) and computation continues of finer-scale eddies continues using the modified basic flow equations (step 620). When required modifications of force is sufficiently small, the eddies at the finer-scale are deemed as having been computed and the computation of finer-scale eddies of the turbulent flow ends (step 640).

As shown by arrow 650, the results of the process 600 represent the intermediate-scale eddies 220 in the real world turbulent flow 200 described previously with respect to FIG. 2. In addition, as shown by arrow 660, the results of the process 600 are used to provide more detail for coarse-scale eddies 210 of the turbulent flow. Stated differently, the results of process 600 are used to help refine the simulation of the coarse-scale eddies 210 of the turbulent flow by providing greater granularity and better quality of flow data.

Figure 7A:
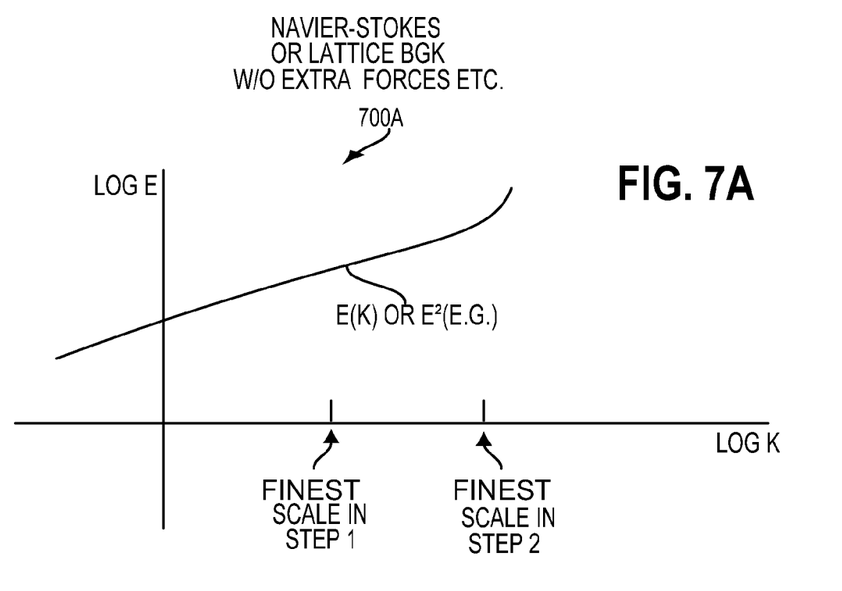
FIGS. 7A and 7B are diagrams of qualitative energy spectrums of a turbulent flow.
Figure 7B:
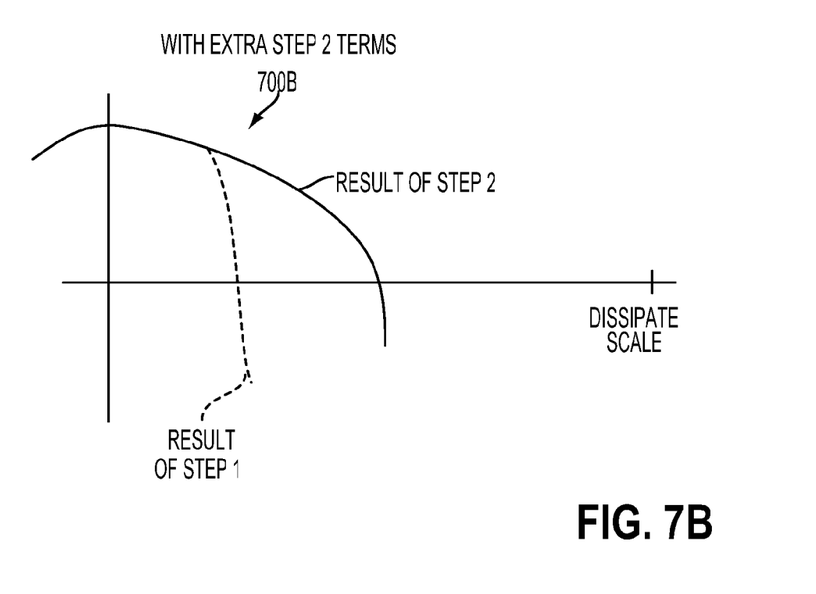

FIGS. 7A and 7B respectively illustrate the qualitative energy spectrums 700A and 700B of a turbulent flow. As shown, spectrum 700A illustrates the results of computation of coarse-scale eddies and finer-scale eddies without forcing the computation of finer-scale eddies, as described previously with respect to FIG. 5. In contrast, spectrum 700B shows the results of forcing the computation of finer-scale eddies, such as through applying a relaxation model or a dynamical constraint. Without forcing the computation of finer-scale eddies to stay within constraints of the coarse-scale eddy, the flow computation of the finer-scale eddies breaks down and becomes physically inaccurate. For example, as illustrated in FIG. 7A, the finer eddies at low resolution appear to have higher energy than the coarse scale eddies, which is not correct from a physical perspective.

Figure 8:
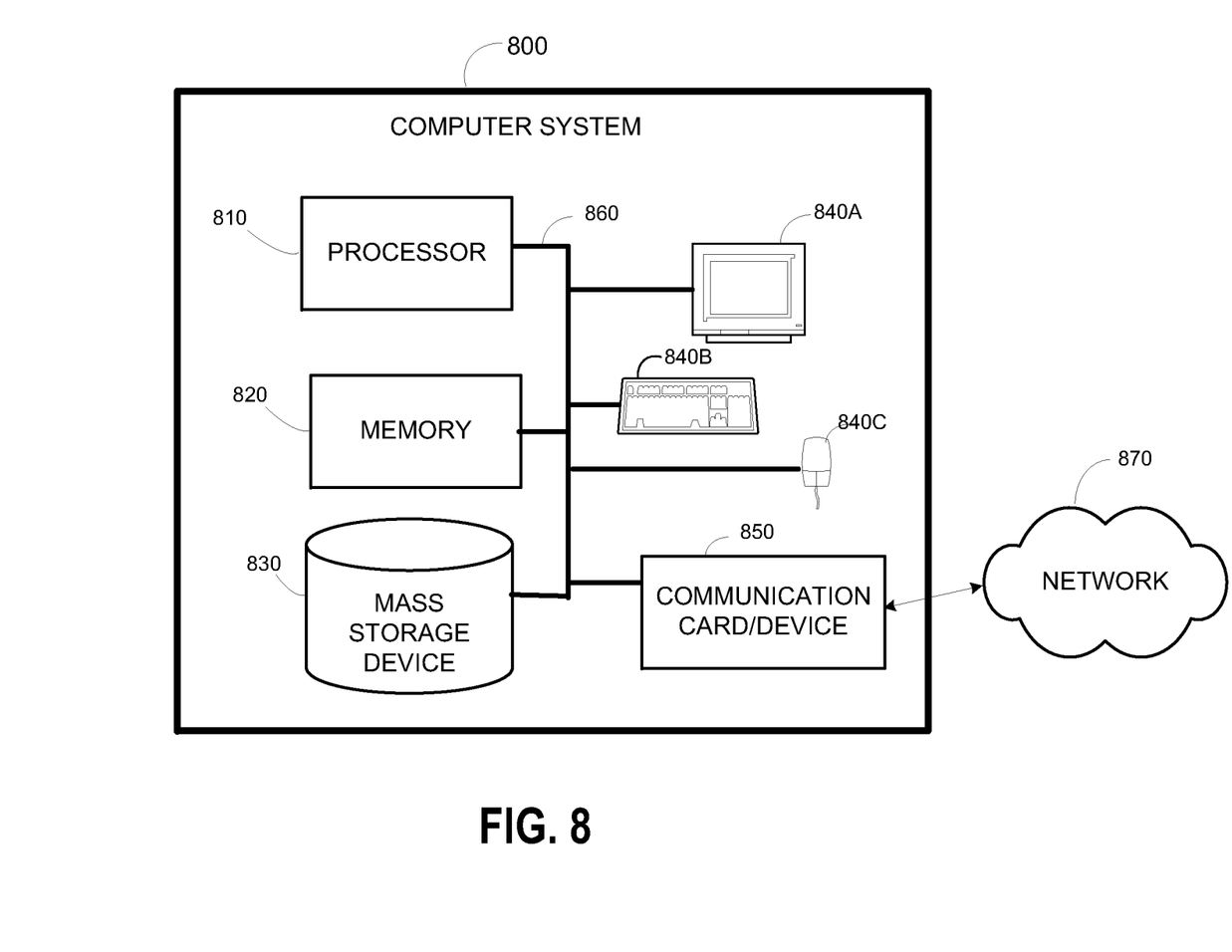
FIG. 8 is a block diagram of a computer system capable of performing a cascaded eddy simulation.

Referring to FIG. 8, a system 800 can be used to implement the techniques described above. As illustrated, the system 800 is a computer system that includes a processor 810, a memory 820, a mass storage device 830, input/output devices 840A, 840B and 840C, and a communication card or device 850. The system 800 also includes a system bus 860 that connects, directly or indirectly, each of the components 810, 820, 830, 840A, 840B, 840C and 850.

The processor 810 is capable of processing instructions for execution within the system 800. The processor 810 may be a single-core, single-threaded processor or a multi-core and/or multi-threaded processor or a cluster of two or more such processors. The processor 810 is capable of processing instructions stored in the memory 820 or on the storage device 830.

The memory 820 is an internal data storage area of the computer 800. The memory 820 may be implemented using computer chips capable of storing data. The memory 820 may be referred to as main memory, core memory or physical memory. The memory 820 may be volatile or non-volatile.

The mass storage device 830 is capable of providing mass storage for the system 800. The mass storage device 830 is a computer-readable medium. For example, the storage device may use any storage media (including magnetic, optical or solid state storage media) or any type of storage device (including a magnetic drive (such as a hard disk or a floppy disk), various types of compact discs (CDs) and DVDs ("digital video discs"), flash memory, or a solid-state device. In some implementations, the storage device 830 may be used to provide virtual memory for the computer system 800.

The input/output devices 840A-840C provides input/output operations for the system 800. In particular, the computer system 800 includes a display device 840A, a keyboard 840B and a pointing device 840C.

The communication card or device 850 is operable to exchange data with a network 870 using a communication link 875 (such as a telephone line, a wireless network link, a wired network link, or a cable network). Examples of a communication card or device 850 include a modem and a network adapter.

Other examples of system 800 are a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

CES techniques are compatible with 'out-of-core' simulations that are quite challenging for other methods. In this case, the fully resolved flow field at a given Reynolds number would require so much computer memory that it could not be stored within central memory (such as computer memory 820) but would, in addition, require substantial secondary storage (such as mass storage device 830). More particularly, coarse-scale eddies of step 410s may be computed 'in-core' (such as using computer memory 820) without the use of secondary storage (such as mass storage device 830). Core or main computer memory generally would be sufficient to compute the coarse-scale eddies because the resolution requirements of that computation (i.e., step 410) are not Reynolds number dependent. The computation of finer-scale eddies, as in step 420, may require secondary storage, such as mass storage device 830. Moreover, the flow simulations computed for finer-scale eddies (as in step 420) are effectively driven (that is, forced) by the computation of coarse-scale eddies in step 410. As such, locally regular grids could be used, where such grids are more easily amenable to "out-of-core" memory simulations because data structures used are typically simple. As an example of this 'out-of-core' memory simulation, which also illustrates the kind of simplifications possible in step 420, but possibly not in complex geometry DNS or LES, is the use of 'hyperviscosity' or another method to more effectively describe fine-scale dissipation than possible with Newtonian or simple sub-grid viscosities. The physical reason that CES works in these latter cases, but DNS/LES does not, is that the turbulence generation mechanisms are effectively described in step 410 but the Reynolds-number dependent dissipation scales only appear in step 420 as eddies driven by the results of step 410. It is this careful balance between resolution and physics afforded by the minimally two step CES process that is a key to some of the disclosed techniques.

Referring again to FIG. 4, the process 400 in some implementations may compute additional cascaded eddies at an even finer scale using results of the finer-scale eddy computation of step 420 to constrain flow dynamics of the additional cascaded eddies (step 430). Step 430 generally extends resolution limited scales to scales that are much finer than achievable by using a two-step flow simulation of steps 410 and 420.

In some cases, especially at high Reynolds numbers, a three-step process (steps 410 to 430) may be employed to obtain the dissipation scale of the turbulence, which is typically of order of R times finer than the coarse-scales of the turbulence. For example, if R is of order $10^8$ and typical supercomputers can handle a range of scales of order $10^3$, there are at least five orders of magnitude difference between the results of the two-step process (steps 410 and 420) and the results required for full turbulence simulation. In most of the volume of high Reynolds number flows, the additional range of scales may play a relatively smaller role, but it is well known from turbulence theory that turbulence is highly intermittent at fine scales in localized regions. The purpose of step 430 and beyond is to systemically allow the simulation of these highly intermittent, yet important, flow regions. The basic idea is to do a conditional sample of the flow to choose representative flow regions where significant activity may take place at fine scales (step 430A). If a random sampling of flow regions were made without conditioning this sampling, there may be little advantage compared to a full high-resolution simulation at the high Reynolds number, which is simply not feasible today. The conditional sampling can be done, for example, by conditioning on local shear, local vorticity, a combination of shear and vorticity, or another flow characteristic. Once the local flow region is identified (and there may be many of them at each subsequent step), the next step is to simulate the flow at the highest feasible resolution in this local flow region (step 430B). This can be done by various methods. In some implementations, the technique is to follow that of roughly step 420 in which the fine scale simulation involves relaxing or locking into the flow scales the coarsest scales of the fine scale simulation computed in the previous step of the procedure at the location of the fine scale simulation. Once this relaxation or locking is accomplished, the flow Reynolds number at that simulation step (here, step 420 or a subsequent step) is adjusted so that an accurate simulation on the available grid is accomplished. This generates data at succeedingly finer scales, and describes the intermittent generation of localized turbulence structures. After a number of steps of order log R, the full scale simulation at Reynolds number R is accomplished. Generally, step 430 may be referred to as a third step or step 3 of the CES process.

Figure 9:
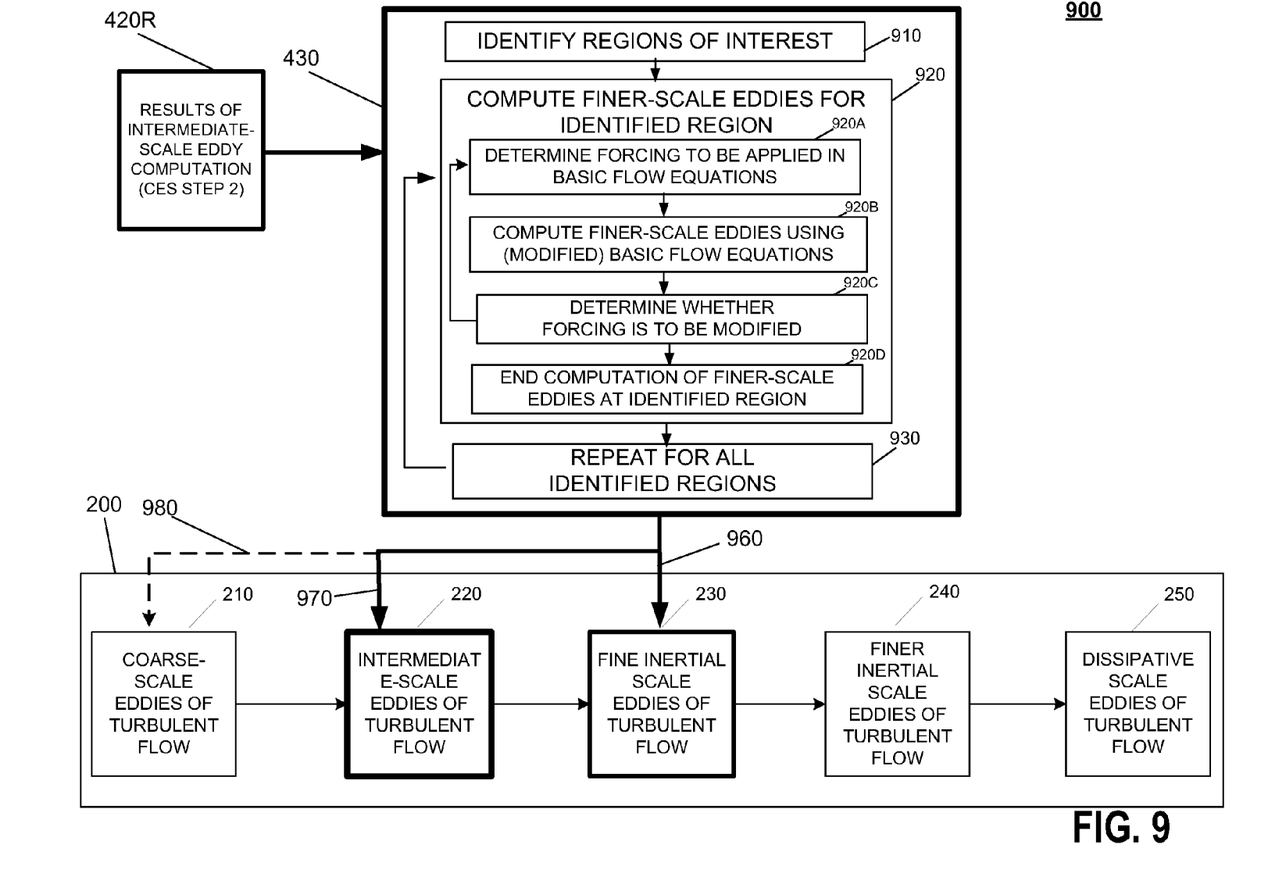
FIG. 9 is a flow chart of an example process for computing the turbulent flow of finer-scale eddies.

FIG. 9 shows an example process 900 for extending computation to the turbulent flow of finer-scale eddies. The example process 900 may be an implementation of step 430 described previously with respect to FIG. 4. The process 900 uses results 420R of intermediate-scale eddy computation of the turbulent flow, such as the result of step 420 described previously.

The process 900 includes identifying regions of interest (step 910), as described previously with respect to step 430A of FIG. 4. The process 900 also includes computing finer-scale eddies for each of the identified regions (steps 920 and 930). In the example process 900, a process used to compute the intermediate-scale eddies in step 920 is substantially similar to the process 600 described previously with respect to FIG. 6. The process used to compute finer-scale eddies for an identified region, however, need not necessarily be the same as the process used to compute eddies of another scale.

More particularly, computing finer-scale eddies for an identified region includes determining the initial forcing to be applied in the basic flow equations (step 920A), as described previously with respect to step 610 of FIG. 6. Similarly to steps 620 and 630 of FIG. 6, after computing finer-scale eddies using the (modified) basic flow equations for a period of time (step 920B), the partial computation results are checked to determine whether the forcing being applied in the modified basic equations needs to be changed (step 920C). If a determination is made that the forcing applied in the basic flow equations needs to be changed to reflect the results of computing the coarse-scale eddies, the forcing to be applied is determined (step 920A) and computation of finer-scale eddies continues using the modified basic flow equations (step 920B). The computation of finer-scale eddies of the turbulent flow ends when the eddies at the finer-scale have been computed (step 920D).

Once computing finer-scale eddies at an identified region is completed (step 920), the process repeats by computing finer-scale eddies at another identified region until finer-scale eddies have been computed for all identified regions (step 930).

Alternatively or additionally, in lieu of identifying the regions of interest prior to computing finer-scale eddies for one region of interest (in step 910), a region of interest may be identified, finer-scale eddies may be computed for the identified region, a determination may be made as to whether finer-scale eddies are to be computed for another region, and, if so, the finer-scale eddies for the other region are computed, and so on until a determination is made that there are no more regions of interest for which finer-scale eddies are to be computed.

As shown by arrow 960, the results of the process 900 represent the fine inertial-scale eddies 230 in the real world turbulent flow 200 described previously with respect to FIG. 2. In addition, as shown by arrow 970, the results of the process 900 are used to provide more detail for intermediate-scale eddies 220 of the turbulent flow. The results of the process 900 may be propagated to further refine the coarse-scale eddies, as illustrated by arrow 980. As such, a portion of the coarse-scale eddies may be refined to show the indirect influence of the finer scale eddies on the coarse-scale eddies.

The process of using results of a coarser-scale eddy computation to influence the computation of finer-scale eddies may be iteratively continued as necessary until dissipative scale eddies of the turbulent flow are computed.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage medium or device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from spirit and scope of the claims. For example, the steps of the disclosed techniques and concepts may be performed in a different order and/or the components in the disclosed systems may be combined in a different manner and/or replaced or supplemented by other components. Other implementations are within the scope of the following claims.

What is claimed is:

1. A non-transitory computer readable medium embodied a computer program for simulating a fluid flow, the computer program causing a computer to:
perform operations on data stored in a memory to:
compute a first set of results that include at least one coarse eddy of a transient fluid flow; and
determine a modification of a first flow equation used to compute at least one cascaded eddy of the fluid flow, the modification including one or more additional terms representing additional forces, filters, dampening terms, or relaxation terms;
perform operations to supplement the first set of results that includes the coarse eddy of the transient flow by computing a second set of results that include at least one cascaded eddy of the fluid flow using the first flow equation as modified such that the computation of the second set of results that includes the at least one cascaded eddy of the fluid flow is constrained by the first set of results of the computation of the at least one coarse eddy of the fluid flow, with the second flow equation differing from turbulence modeling of the first flow equation to enable calculation of finer eddies which are smaller than a turbulence model dissipation length; and
calculating using a processor, based on the first and second set of results including the least one coarse eddy of the transient fluid flow, a constraining term that ensures that flow behavior of second coarser eddies calculated using the second flow equation corresponds to the flow behavior of a first coarser eddies calculated using the first fluid flow equation, wherein the second fluid flow equation includes the constraining term.

2. The computer program of claim 1 wherein the computation of the at least one cascaded eddy of the fluid flow is constrained by forcing the computation of the second set of results by applying a relaxation model or a dynamical constraint such that an energy spectrum of the fluid flow is substantially the same statistically as the results of the computation of the at least one coarse eddy of the fluid flow.

3. The computer program of claim 1 further configured to cause the computer to perform operations to compute a third set of results that include at least one additional cascaded eddy of the fluid flow wherein:
the computation of the at least one additional cascaded eddy of the fluid flow is constrained by results of the computation of the at least one cascaded eddy of the fluid flow.

4. The computer program of claim 3 further configured to:
identify a region of the fluid flow representing a region of activity that is significant to the computing of the fluid flow; and
perform operations to compute at least one additional cascaded eddy of the identified region of the fluid flow.

5. The computer program of claim 4 further configured to perform operations to conditionally sample the fluid flow to identify the region of significant activity.

6. The computer program of claim 4 wherein conditionally sampling the fluid flow comprises conditionally sampling at least one of local shear, local vorticity and a combination of shear and vorticity.

7. The computer program of claim 1 wherein performing operations to compute at least one cascaded eddy of the fluid flow further comprises:
determining whether the forcing being applied in the modified flow equations is to be modified,
in response to a determination that the forcing is to be modified, determine a second forcing to be applied by a flow equation used to compute the at least one cascaded eddy of the fluid flow, and
computing the at least one eddy of the fluid flow using the flow equation modified by the determined second forcing.

8. The computer program of claim 1 wherein the modified flow equation used to compute the at least one cascaded eddy of the fluid flow comprises a modified Navier-Stokes equation.

9. The computer program of claim 1 wherein the modified flow equation used to compute the at least one cascaded eddy of the fluid flow comprises a modified kinetic equation.

10. The computer program of claim 1 wherein the modified flow equation used to compute the at least one cascaded eddy of the fluid flow comprises a modified flow equation that includes a relaxation term.

11. The computer program of claim 1 wherein the modified flow equation used to compute the at least one cascaded eddy of the fluid flow comprises a modified flow equation that includes a dampening term.

12. A computer system for simulating a fluid flow, the system comprising: a processor, a memory and a mass storage device and being configured to:
perform operations on data stored in the memory to compute a first set of results that include at least one coarse eddy of a transient fluid flow;
determine a modification of a first flow equation used to compute at least one cascaded eddy of the fluid flow, the modification including one or more additional terms representing additional forces, filters, dampening terms, or relaxation terms;

perform operations to supplement the first set of results that includes the coarse eddy of the transient flow by computing a second set of results that include at least one cascaded eddy of the fluid flow using the first flow equation as modified such that the computation of the second set of results that includes the at least one cascaded eddy of the fluid flow is constrained by the first set of results of the computation of the at least one coarse eddy of the fluid flow, with the second flow equation differing from turbulence modeling of the first flow equation to enable calculation of finer eddies which are smaller than a turbulence model dissipation length; and calculate using a processor, based on the first and second set of results including the least one coarse eddy of the transient fluid flow, a constraining term that ensures that flow behavior of second coarser eddies calculated using the second flow equation corresponds to the flow behavior of a first coarser eddies calculated using the first fluid flow equation, wherein the second fluid flow equation includes the constraining term.

13. The computer system of claim 12 wherein the computation of the at least one cascaded eddy of the fluid flow is constrained by forcing the computation of the second set of results by applying a relaxation model or a dynamical constraint such that an energy spectrum of the fluid flow is substantially the same statistically as the results of the computation of the at least one coarse eddy of the fluid flow.

14. The computer system of claim 12 further configured to perform operations to compute a third set of results that include at least one additional cascaded eddy of the fluid flow wherein:

the computation of the at least one additional cascaded eddy of the fluid flow is constrained by results of the computation of the at least one cascaded eddy of the fluid flow.

15. The computer system of claim 14 further configured to:

identify a region of the fluid flow representing a region of activity that is significant to the computing of the fluid flow; and perform operations to compute at least one additional cascaded eddy of the identified region of the fluid flow.

16. The computer system of claim 15 further configured to perform operations to conditionally sample the fluid flow to identify the region of significant activity.

17. The computer system of claim 15 wherein conditionally sampling the fluid flow comprises conditionally sampling at least one of local shear, local vorticity and a combination of shear and vorticity.

18. The computer system of claim 12 wherein performing operations to compute at least one cascaded eddy of the fluid flow further comprises:

determining whether the forcing being applied in the modified flow equations is to be modified, in response to a determination that the forcing is to be modified, determine a second forcing to be applied by a flow equation used to compute the at least one cascaded eddy of the fluid flow, and computing the at least one eddy of the fluid flow using the flow equation modified by the determined second forcing.

19. The computer system of claim 12 wherein the modified flow equation used to compute the at least one cascaded eddy of the fluid flow comprises a modified Navier-Stokes equation.

20. The computer system of claim 12 wherein the modified flow equation used to compute the at least one cascaded eddy of the fluid flow comprises a modified kinetic equation.

21. The computer system of claim 12 wherein the modified flow equation used to compute the at least one cascaded eddy of the fluid flow comprises a modified flow equation that includes a relaxation term.

22. The computer system of claim 12 wherein the modified flow equation used to compute the at least one cascaded eddy of the fluid flow comprises a modified flow equation that includes a dampening term.

* * * * *